July 6, 1926.                                                      1,591,555
G. H. HANNUM
SHIELD FOR VEHICLE DOORS
Filed Feb. 23, 1924                 2 Sheets-Sheet 1
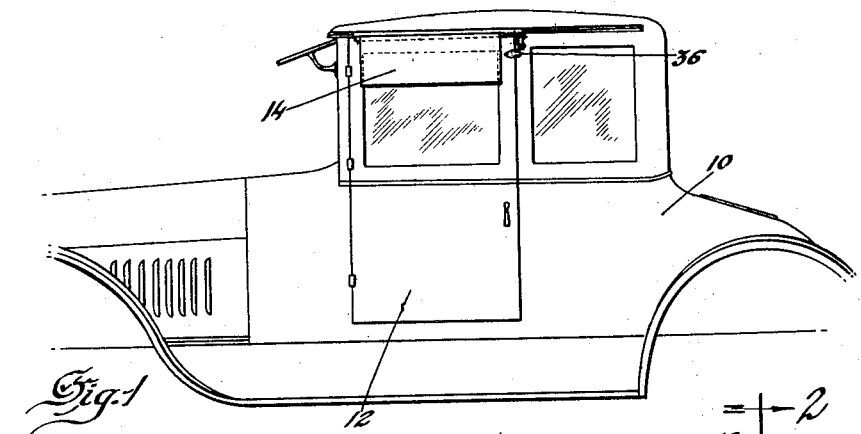
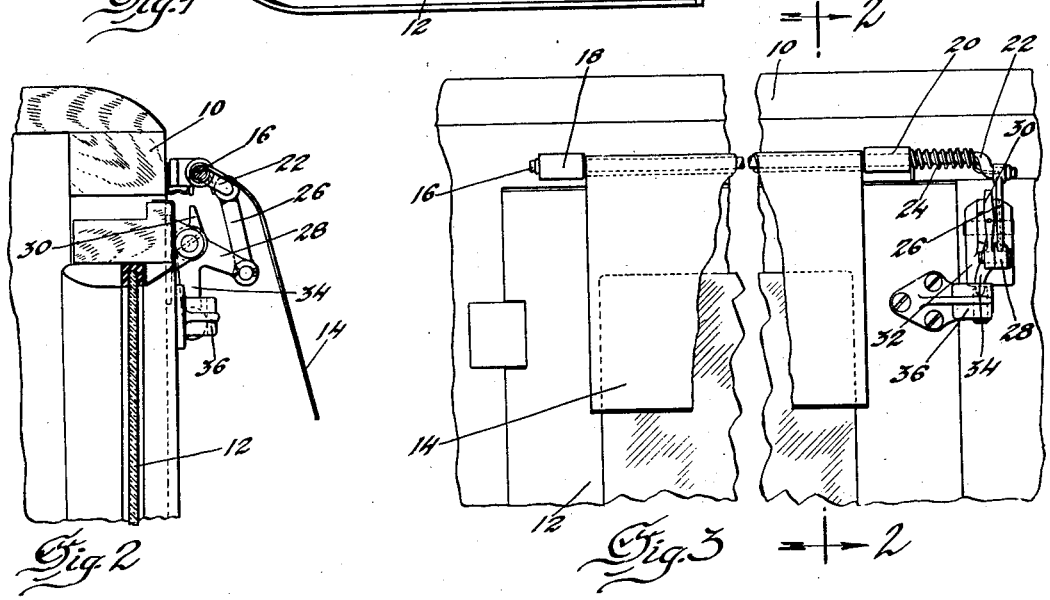
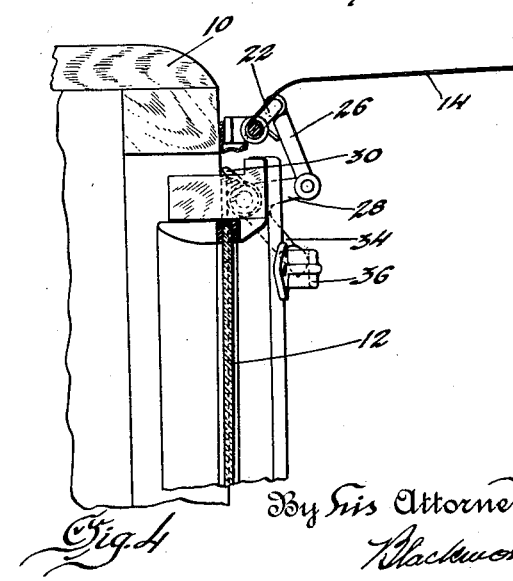
Inventor
George H. Hannum
By his Attorneys
Blackmore, Spencer & Hulbert July 6, 1926.

G. H. HANNUM

SHIELD FOR VEHICLE DOORS

Filed Feb. 23, 1924 2 Sheets-Sheet 2

1,591,555

Inventor
George H Hannum
By his Attorneys
Blackmore, Spencer & Flint

Patented July 6, 1926.

1,591,555

UNITED STATES PATENT OFFICE.

GEORGE H. HANNUM, OF PONTIAC, MICHIGAN, ASSIGNOR TO GENERAL MOTORS CORPORATION, OF DETROIT, MICHIGAN, A CORPORATION OF DELAWARE.

SHIELD FOR VEHICLE DOORS.

Application filed February 23, 1924. Serial No. 694,642.

This invention relates to a shield, and is illustrated as embodied in an automobile having a shield movably supported for swinging movement as the door is opened.

An object of the invention is to provide a shield for the door of an automobile, particularly of the closed type, which will protect the opening of the door when the glass is lowered, against rain and form a shade for the occupants of the automobile. The device may be referred to as a visor such as commonly used over the windshield.

In order that the opening of the door may be properly protected against rain or sun, a permanent shield must extend beyond the side of the car an objectionable distance or extend over the opening in the path of the door when the door opens. Due to the difficulty in opening the door with a permanent shield of the type referred to, applicant provides a shield which does not extend an unobjectionable distance beyond the side of the car and which swings out of the path of the door by opening the latter.

Another object of the invention is to provide a shield-operating means actuated by opening and shutting the door. In one desirable arrangement, a spring urges the shield into its upper position, while a stop carried by the door engages a lever; as the door is closed, to lower the shield against the resistance of the spring. In another arrangement shown in the drawings, the shield is operated by a cam rod engaged by a follower on the door. While the shield-operating means embodies substantial novelty in itself, it is especially advantageous when operated by the act of opening or closing the door.

The above and other objects and features of the invention, including various novel combinations and desirable particular constructions, will be apparent from the following description of two illustrative embodiments shown in the accompanying drawings, in which Fig 1 is a side elevation of part of an automobile having a shield adjacent its door;

Fig. 2 is a vertical cross-section through the top of the door, showing the stop carried by the door in the act of lowering the shield;

Fig. 3 is a view, partly broken away, from the same point of view as Fig. 1, but showing the top of the door on a larger scale;

Fig. 4 is a sectional view corresponding to Fig. 2, but showing the shield in its upper or active position;

Figures 5, 6:
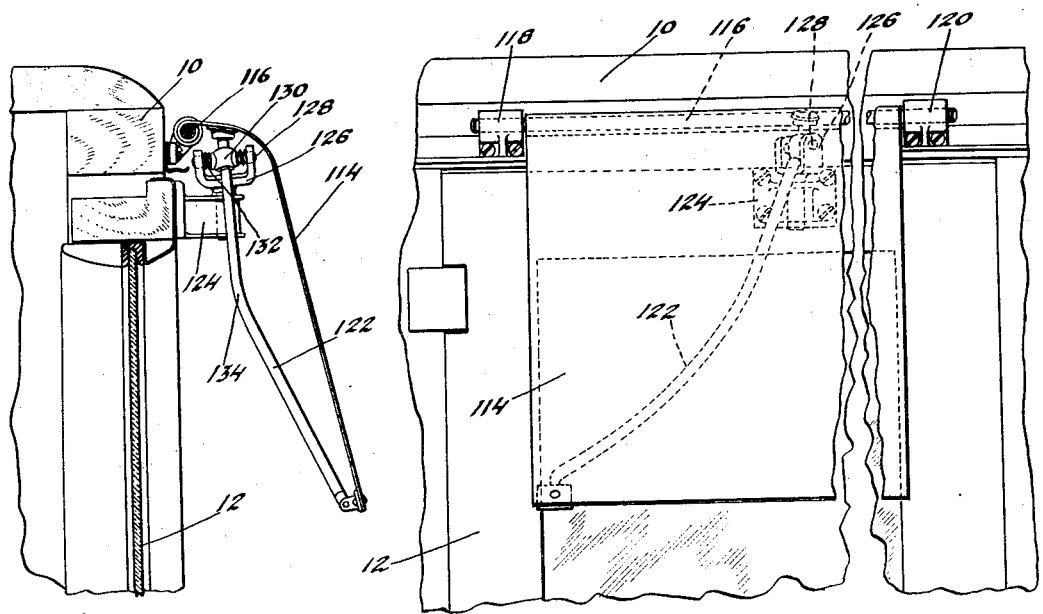
Fig. 5 is a vertical section corresponding to Fig. 2, but showing a modification.
Fig. 6 is a side elevation, partly broken away, corresponding to Fig. 3, but showing the modified shield and the top of the door on a large scale.

The invention is shown as embodied in an automobile having a body 10 and an outwardly-swinging door 12. In the preferred form of Figs. 2, 3, and 4, a shield 14 is movably mounted adjacent the top of the door, being secured to a rod 16 journaled in supports 18 and 20 on the body, and bent at one end to provide a crank arm 22. The shield is urged upwardly about the axis of rod 16 by a torsion spring 24. The crank arm 22 is connected by a link 26 to one arm of a bellcrank lever 28 which has a stop lug 30 to engage its supporting plate 32, and an arm 34 to be engaged by a stop 36 projecting from the edge of the door to lower the shield as the door is closed. Thus opening the door permits spring 24 to raise the shield, while closing the door causes stop 36 to rock the bellcrank lever 28 to lower the visor.

In the operation of this preferred form, as the door begins to open the stop 36 moving away from the bellcrank 28 allows the spring 24 under tension to raise the shield until the stop 30 engages the supporting plate 32 limiting the movement of the shield. When the door is closed the shield remains in its upper position as shown in Figure 4 until the door has nearly reached its closed position. At this position the stop 30 engages the arm 34 and further movement of the door causes the bellcrank lever to pivot the shield against the tension of the spring 24 and at the same time offers a resistance to the final closing movement of the door.

Figure 7:
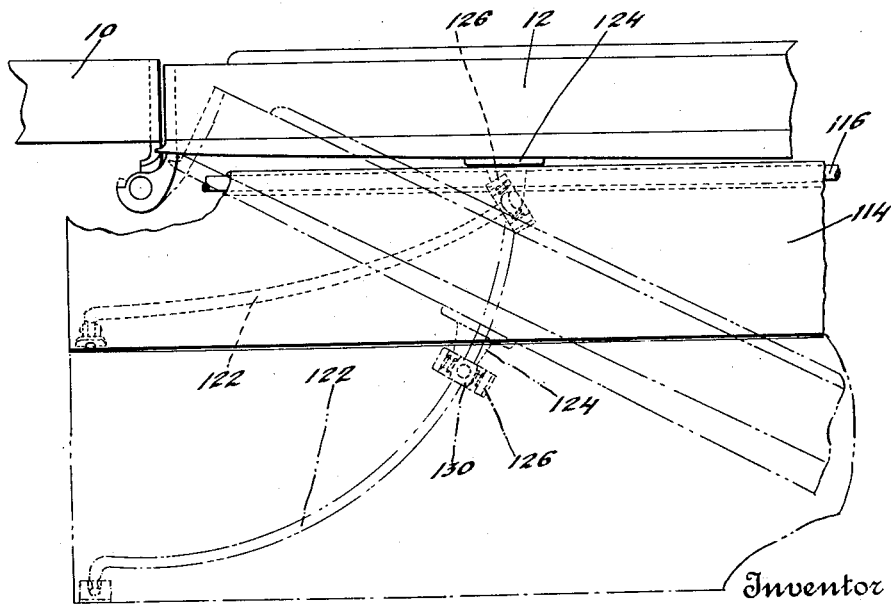
Fig. 7 is a top plan view of the parts shown in Figs. 5 and 6.

In the modification shown in Figs. 5, 6, and 7, a shield 114 is secured to a rod 116 journaled in supports 118 and 120. The shield carries a cam rod 122 secured thereto at its opposite ends, and arranged to be operated, to swing the shield up and down, by a follower on the door. This follower comprises an operating member or support 124 secured to the door, and swinging horizontally with the door, and in which is journaled the vertical stem of a yoke 126. This yoke receives opposite pintles 128 of a member 130 which is perforated and slidably mounted on the cam rod 122. Light springs 132 may be mounted on the pintles 128, yieldingly to center member 130 with respect to yoke 126.

In the operation of this device, as the door begins to open (Fig. 5), member 130 is forced to slide along rod 122, turning as it slides, and swinging the shield vertically. This continues until the shield is substantially horizontal, the door at that time being partly open. At this time member 130 passes a bend 134 in the cam rod, beyond which point the cam rod is curved on an arc whose center is in the axis of the door hinges (the shield being in horizontal or upper position), so that member 130 thereafter slides idly along the cam rod, and merely supports the shield.

While two desirable particular embodiments of my invention have been described in detail, it is not my intention to limit its scope to those embodiments, or otherwise than by the terms of the appended claims.

I claim:

1. A vehicle comprising, in combination, a door, a door casing, a shield pivoted adjacent the top of the door, a spring for rocking the shield upward, a lever for rocking the shield downwardly against the resistance of the spring, and a stop on the door positioned to engage and operate the lever when the door has nearly reached its closed position.

2. A vehicle comprising, in combination, a door having an opening, a door casing, a shield pivoted adjacent the top of the door, a lever for rocking the shield downwardly against the resistance of the spring, and a stop on the door to engage and operate said lever when the door is closed rocking the shield downwardly against the resistance of the spring to a position over the opening of the door to protect the same against sun and rain.

3. In a device of the class described comprising, in combination, a door, a door casing, a shield secured to a rod journaled in supports adjacent the top of the door on said door casing, a crank arm at one end of the rod, a torsion spring about the axis of the rod urging the shield into its upper position, a bellcrank carried by the door casing connected to said crank arm, and a stop on the door to engage and operate said bellcrank when the door closes rocking the shield downwardly against the resistance of the spring.

4. In a device of the class described comprising, in combination, a door, a door casing, a shield pivoted adjacent the top of the door, a spring for rocking the shield upward, a bellcrank carried by the door casing connected to said shield, a stop on said bellcrank for limiting its upward movement, and a stop on the door to engage and operate said bellcrank when the door is closed rocking the shield downwardly against the resistance of the spring.

5. A vehicle comprising, in combination, a door having an opening, a door casing, a shield pivoted adjacent the top of the door and projecting outwardly over the opening of said door to form a protection therefor when the door is closed, means for urging the shield upwardly when the door is opened, and means carried by the door for returning the shield when the door is closed.

6. A vehicle comprising, in combination, a door having an opening, a door casing, a shield pivoted adjacent the top of the door and projecting outwardly and downwardly over the opening of said door to form a protection therefor when the door is closed, means for urging the shield upwardly when the door is opened, and means carried by the door for returning the shield when the door is closed, said last named means only operative when the door has nearly reached its closed position.

7. A vehicle comprising, in combination, a door, a door casing, a shield pivoted adjacent the door, a spring urging the shield away from a predetermined position, a lever mechanism on said door casing for pivoting said shield against the tension of the spring, and a stop on the door to engage and operate said lever mechanism when the door is closed returning the shield to its predetermined position.

8. A vehicle comprising, in combination, a door, a door casing, a shield pivoted adjacent the door, operating connections on said door casing for pivoting said shield in one direction, means on the door for operating said connections, and means for pivoting said shield in the opposite direction and resisting the final closing movement of the door.

In testimony whereof I affix my signature.

GEORGE H. HANNUM.